(12) United States Patent
Zimmer

(10) Patent No.: US 6,708,365 B1
(45) Date of Patent: Mar. 23, 2004

(54) DRIVE MECHANISM FOR A WIPER SYSTEM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 339 days.

(21) Appl. No.: 09/787,572

(22) PCT Filed: Jul. 11, 2000

(86) PCT No.: PCT/DE00/02252

§ 371 (c)(1),
(2), (4) Date: Mar. 19, 2001

(87) PCT Pub. No.: WO01/07303

PCT Pub. Date: Feb. 1, 2001

(30) Foreign Application Priority Data

Jul. 24, 1999 (DE) .......................................... 199 34 869

(51) Int. Cl.[7] .............................. B60S 1/16; B60S 1/24
(52) U.S. Cl. ............................... 15/250.21; 15/250.14; 15/250.27; 15/250.3; 74/42; 74/43
(58) Field of Search ....................... 15/250.14, 250.21, 15/250.23, 250.27, 250.3, 250.31; 74/42, 43

(56) References Cited

U.S. PATENT DOCUMENTS

| | | | |
|---|---|---|---|
| 4,512,056 A | 4/1985 | Wattier | |
| 4,672,709 A | 6/1987 | Licata | |
| 4,843,898 A | * 7/1989 | Ishikawa | ........................ 74/51 |
| 5,165,159 A | * 11/1992 | Egner-Walter et al. | ....... 29/434 |
| 5,920,948 A | 7/1999 | Hayashi et al. | |
| 6,292,975 B1 | * 9/2001 | Isii et al. | .................. 15/250.31 |

FOREIGN PATENT DOCUMENTS

| | | |
|---|---|---|
| EP | 0 424 834 A | 5/1991 |
| EP | 0 781 691 A1 | 7/1997 |
| JP | 10-258707 | * 9/1998 |
| JP | 10-278744 | * 10/1998 |

* cited by examiner

Primary Examiner—Terrence R. Till
(74) Attorney, Agent, or Firm—Michael J. Striker

(57) ABSTRACT

The drive apparatus for a wiper system (10) has a reversible wiper motor (18), a lever drive mechanism connected with a wiper (12), which includes a drive lever (36), e.g. a cross guide rod, and a four-bar wiper lever (40) connected with it, and a coupling mechanism (20) for coupling the lever drive mechanism with the wiper motor. The coupling mechanism (20) includes a crank (22) attached to the wiper motor (18), a coupling rod (24) pivotally connected to the crank (22) and in articulated fashion to guide rod (26) pivotally supported on a vehicle body. A joint rod (28) is pivotally connected to the coupling rod (40) and the drive lever (36) to drive the lever drive mechanism and hence the wiper (12) with the drive motor via the coupling mechanism (20).

21 Claims, 5 Drawing Sheets

DRIVE MECHANISM FOR A WIPER SYSTEM

BACKGROUND OF THE INVENTION

The invention is based on a wiper system drive apparatus comprising a wiper motor, a lever drive mechanism connected with a wiper of the wiper system and a coupling mechanism connecting the wiper motor with the lever drive mechanism in order to drive the wiper with the wiper motor.

Wiper systems with multiple windshield wipers for motor vehicles are fastened by their wiper bearings directly or indirectly via a mounting plate to the vehicle body. The mounting plate or a tubular mounting plate—if the wiper carrier also includes tubular hollow profiles—includes a motor mounting plate, which carries a wiper drive with a wiper motor and a drive mechanism mounted thereon. A power takeoff shaft of the drive mechanism is mounted in a drive dome and, as a rule via a crank and joint rods, drives further cranks, which are rigidly connected to the drive shafts of the windshield wipers.

It is also possible for the power takeoff shaft of the wiper motor to drive a four-bar lever drive mechanism. This drive mechanism has a drive lever, which is pivotally mounted on a drive axle and is connected in articulated fashion to a guide rod lever via a coupling rod. This lever is pivotally supported on a stationary shaft. A fastening part of a wiper arm is formed integrally onto the coupling rod and with It forms a so-called four-bar wiper lever, to which the joint part of the wiper arm is fastened via a foldaway joint. The drive lever can be driven directly from a power takeoff shaft of the wiper motor or via a crank and joint rods. It can also be embodied as a cross lever. The kinematics of the four-bar lever mechanism effect a combined reciprocating and swiveling motion of the windshield wiper. As a result, the windshield wiper is better able to follow the angular contour of a vehicle window. If two synchronized windshield wipers are provided, then as a rule only one is driven via a four-bar lever mechanism, while the other is connected to a driven element, via a joint rod and a crank.

So that the forces on the joint rods will be slight, the crank has a relatively great length. This means a long radius of the crank path, which together with the typically low ratio of the crank radius to the rod length of approximately 1/4 to 1/7 demands a correspondingly large structural volume and associated room to move for the wiper linkage. Furthermore, it leads to an inharmonious course of motion. Wiper drives with reversible wiper motors are also known, In which the crank on the power takeoff shaft of the wiper motor executes a virtually semicircular pivoting motion. This drive requires markedly less room to move for the crank on the wiper motor.

In the known drives, the position of the wiper motor determines the location and geometry of the drive curve for the joint rods. Since the wiper motor and the lever drive mechanism cannot be positioned arbitrarily however, because the space in the vehicle is limited and is used for other equipment, the result is often unfavorable kinematics, which leads to an unfavorable course of speed and acceleration for the lever mechanism and as a rule requires a large amount of room to move. The result is compromises, which adversely affect the quality and reliability of the wiper system.

From European Patent Disclosure EP 0 781 691 A1, a wiper drive is known that comprises a wiper motor and a lever drive mechanism. An offset-bent drive crank is seated on the power takeoff shaft of the wiper motor. A joint rod, which is pivotally connected to the drive crank via a ball joint, is also pivotally connected by Its free end, again via a ball joint, to a crank embodied as a crank plate, which is fastened to a drive shaft of a windshield wiper. Via a further ball joint, the crank plate is engaged by a second joint rod, which with its free end is pivotally connected to a crank that is fastened to a drive shaft for a second windshield wiper. The lever mechanism comprising cranks and joint rods is very complicated and requires a great amount of room to move.

SUMMARY OF THE INVENTION

According to the invention, a coupling rod, which is pivotally connected to a guide rod pivotally supported on a vehicle body, is connected in articulated fashion to a crank; the thus-formed coupling mechanism is connected to the lever drive mechanism via a joint rod. The coupling mechanism, which In particular requires only little, compact room for motion, If a reversible wiper motor is used, offers many opportunities for pivotally connecting the joint rods and driving them. Thus the kinematics of the wiper drive can be varied such that by the selected articulated connection of the joint rods to the coupling mechanism, an unfavorable position of the wiper motor can be compensated for. As a result, the position of the wiper motor can be selected freely in accordance with the space available in the vehicle, without having to accept the above-described disadvantages Into the bargain.

The coupling rod can be a simple sheet-metal part, which on each of its ends has a joint pin that is adjoined by the guide rod and the crank, respectively, via a bearing shell. The joint pins can be fastened unilaterally to the coupling rod. To avoid bending forces at the attachment points between the joint pins and the coupling rod, it is expedient that the coupling rod have two sheet-metal parts, between which it retains at least one joint pin on its face ends. Because of the two-sided fastening of the joint pins and the bearing of the crank or guide rod between the fastening points, the bending forces are very slight.

If the crank, coupling rod and guide rod are located in the same plane, the joint pins can be embodied cylindrically. If not, ball joints can be provided instead. If the joint pins are fastened to the coupling rod on both of their face ends, then the coupling rod has a considerable height in the region of the joints. It is therefore advantageous to design the coupling rod in forked fashion on its ends, and it retains the joint pin in the fork. As a result it can assume an arbitrary height between the joints, so that in the case of a shallow design of the coupling rod, freedom of motion for the levers and articulation points is assured. This kind of design is suitable both for die-cast coupling rods and for coupling rods made of sheet-metal parts.

If the coupling rod has two sheet-metal parts, then the sheet-metal parts are expediently tacked together locally between the joint pins. One sheet-metal part can be curved toward the other, so that because of the offset bending of the sheet-metal part in the longitudinal direction of the coupling rod, free room to move is obtained for further drive parts. The coupling rod can also have offset bends transversely to the direction of motion, which assure freedom of motion for other drive parts.

The joint rods can be pivotally connected at various points of the coupling gear. This purpose is served by ball pegs, which are disposed for Instance on the crank of the wiper-motor, on the guide rod, on the coupling rod between the joints, or at the joint pins. If the ball pegs are disposed on the crank of the wiper motor or on the coupling rod or on the guide rod, then typically they are secured by wobble riveting. If the coupling rod, is locally tacked together between the joint pins, this can also be done by means of a ball peg which joins the two sheet-metal parts to one another in this region by wobble riveting.

A plurality of windshield wipers, as a rule two, can be driven via the coupling gear. In that case, many ball pegs should be provided, which can also be embodied as double-ball pegs.

BRIEF DESCRIPTION OF THE DRAWING

Further advantages will become apparent from the ensuing description of the drawing. In the drawing, exemplary embodiments of the invention are shown. The drawing, description and claims include numerous characteristics in combination. One skilled in the art will expediently consider the characteristics individually as well and put them together to make useful further combinations. Shown are:

DESCRIPTION OF THE EXEMPLARY EMBODIMENTS

Figure 1:
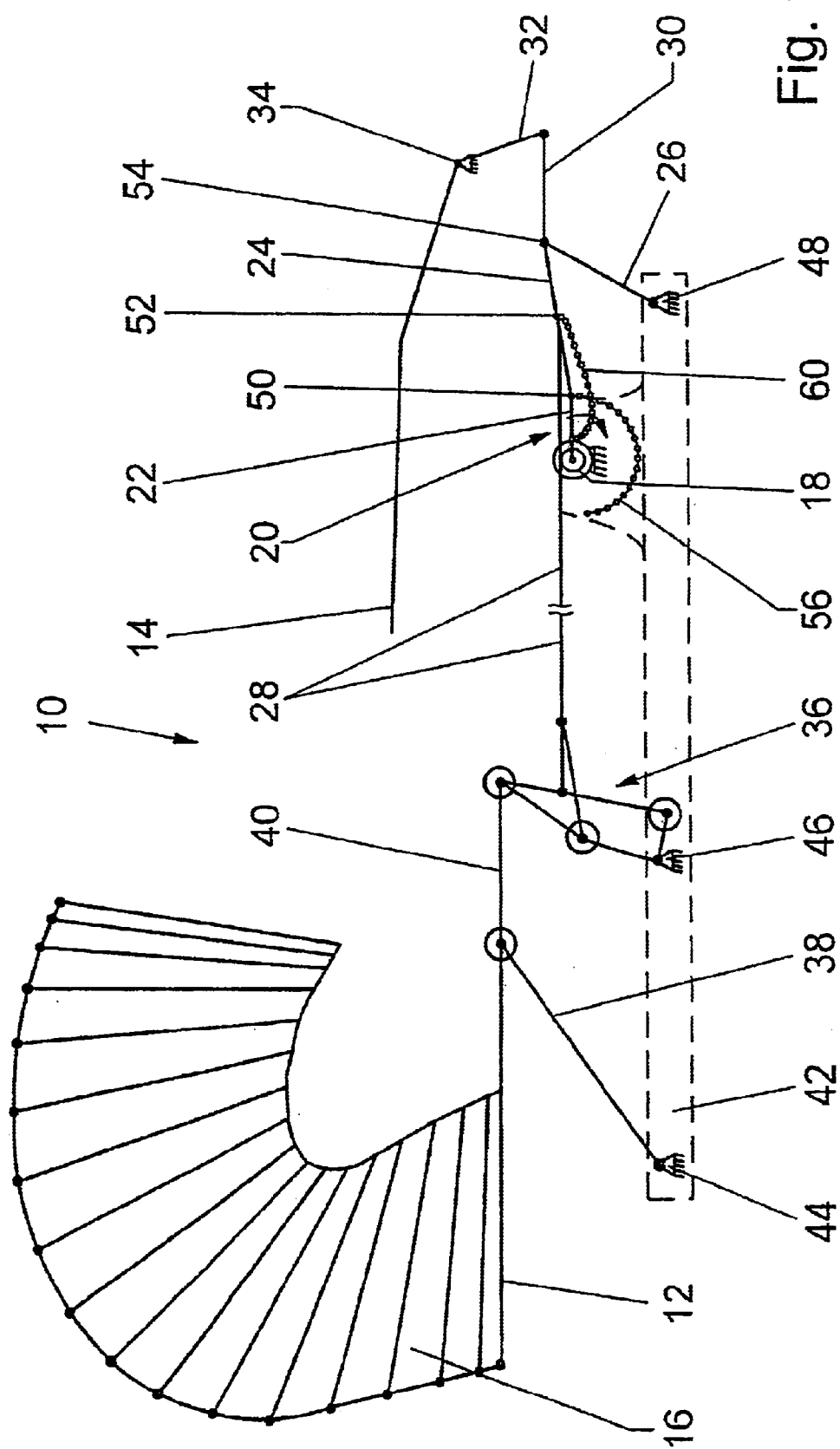
FIG. 1, a schematic illustration of a drive apparatus of a wiper system according to the invention.

The wiper system 10 has two windshield wipers 12 and 14. The windshield wiper 14 is driven by a wiper motor 18 via a coupling mechanism 20 and a joint rod 30. The joint rod 30 is connected in articulated fashion to a crank 32, which drives a drive shaft 34 on which the windshield wiper 14 is mounted. Upon actuation, the windshield wiper 14 executes a simple swiveling motion about the drive shaft 34.

The coupling mechanism 20 includes a crank 22, a coupling rod 24 pivotally connected to the crank 22 via a joint 50, and a guide rod 26, which is connected on one end via a joint 54 to the coupling rod 24 and on its other end is pivotally supported at a bearing point 48 on the vehicle, or on a mounting plate 42 rigidly connected to the vehicle. The crank 22 is driven by the wiper motor 18, which is a reversing motor, and the joint 50 between the crank 22 and the coupling rod 24 describes a motion curve 56.

The wiper 12 is fastened to a four-bar wiper lever 40, which is pivotally connected to a guide rod 38 and to a drive lever in the form of a cross guide rod 36. The guide rod 38 and the cross guide rod 36 are pivotally supported at respective bearing points 44 and 46 on the mounting plate 42. Because of the four-bar wiper lever 40, the windshield wiper 12 executes a reciprocating and swiveling motion and creates a swept field 16 that conforms well to an angular contour of a windshield well.

Figure 2:
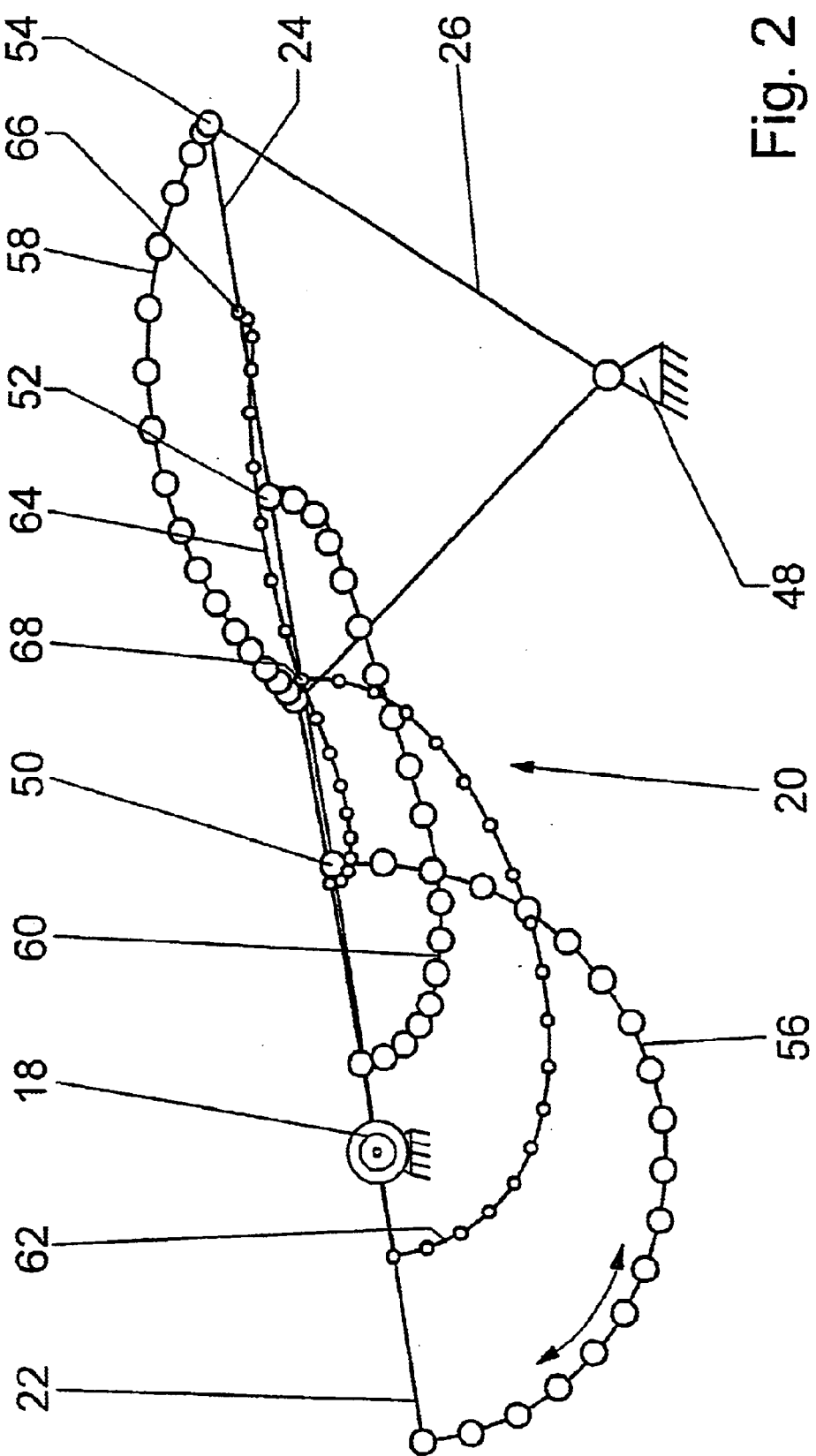
FIG. 2, a schematic illustration of a wiper motor with a coupling mechanism and various motion curves of points on the coupling mechanism.

The cross guide rod 36 is driven by a joint rod 28, which is pivotally connected to coupling rod 24 at a joint 52 having a ball peg 80 between the joints 50 and 54 of the coupling rod 24. During the actuation of the wiper motor 18, the joint 52 describes a motion curve 60 with a very shallow course, so that the joint rod 28 essentially executes a reciprocating motion and thus needs only very little room to move, and this amount of room varies hardly at all if the spacing between the wiper motor 18 and the drive lever 36 varies. FIG. 2, on a larger scale, shows the motion curves 56 of the joint 50 and of the joint 52. Alternative motion curves 62 for an articulation point 68 and a motion curve 64 for an articulation point 66 are also shown. The motion curve 58 Illustrates the swiveling motion of the guide rod 26 about the bearing point 48 and thus the end of the joint rod 30 for the actuation of the windshield wiper 14.

Depending on the disposition of the wipers 12 and 14 and on the position of the wiper motor 18, the joint rods 28, 30 can be articulated at suitable articulation points of the coupling mechanism 20.

Figure 3:
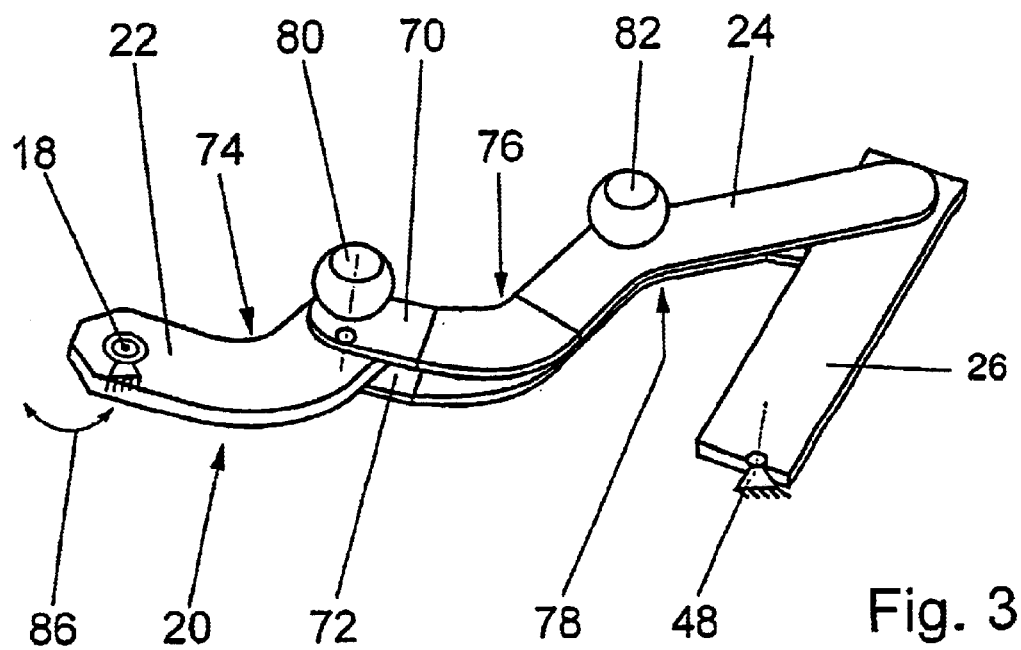
FIG. 3, a perspective view of a coupling mechanism according to the invention.

The embodiment of the coupling mechanism 20 in FIG. 3 has a crank 22 with an offset bend 74 in the direction of motion. Upon a swiveling motion in the direction of the arrow 86, this enables freedom from collision with a bail peg 82 on the coupling rod 24. The coupling rod 24 in turn also has offset bends 76 and 78, which assure freedom from collision with other drive parts.

Figure 4:
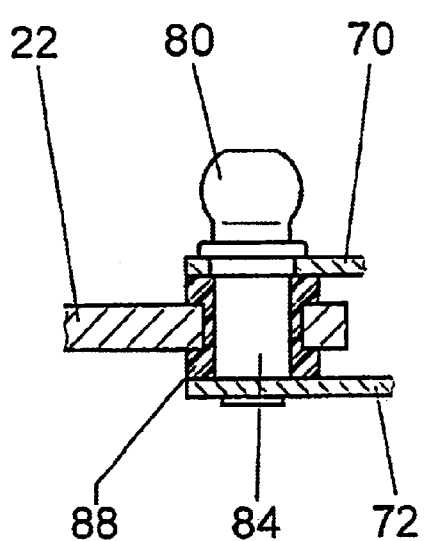
FIG. 4, a side cross-sectional view of a bearing point of the coupling rod of the coupling mechanism.
Figure 5:
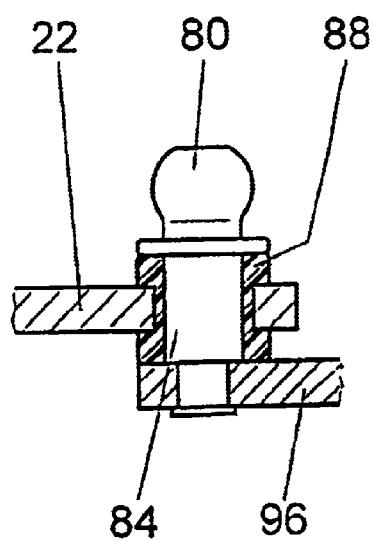
FIGS. 5–6, variants of FIG. 4.
Figure 6:
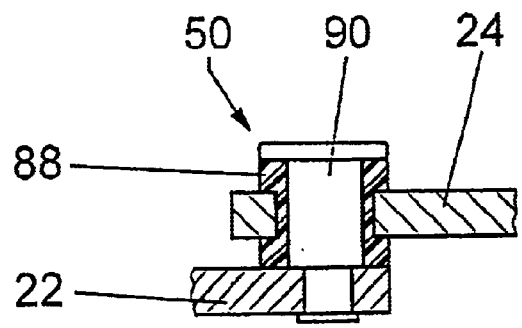

The embodiment of FIG. 4 has a joint pin 84 with a formed-on ball peg 80. The joint pin 84 is connected to coupling rod 24, which comprises two sheet-metal parts 70 and 72, the joint pin being riveted to the sheet-metal part 72, while the other sheet-metal part 70 is retained between a bearing shell 88 and the ball peg 80. The bearing shell 88 is rigidly connected to the crank 22, preferably being cast integral as a plastic part. The version of FIG. 5 differs from the version of FIG. 4 in that the joint pin 84 is unilaterally connected to a coupling rod, which comprises a single sheet-metal part 96 or a corresponding die-cast part. In the embodiment of FIG. 6, a joint pin 90 is riveted unilaterally to the crank 22. Between the crank 22 and a collar of the joint pin 90, the bearing shell 88 is provided, which is rigidly connected to the coupling rod 24.

In the embodiments of FIGS. 7–10, the coupling rod 24 comprises two sheet-metal parts 70 and 72, which are forklike on their ends, being tacked together In a middle region. In the forks on their ends, the sheet-metal parts 70, 72 retain joint pins 84 with bearing shells 88, to which the crank 22 and the guide rod 26, respectively, are fastened.

Figure 7:
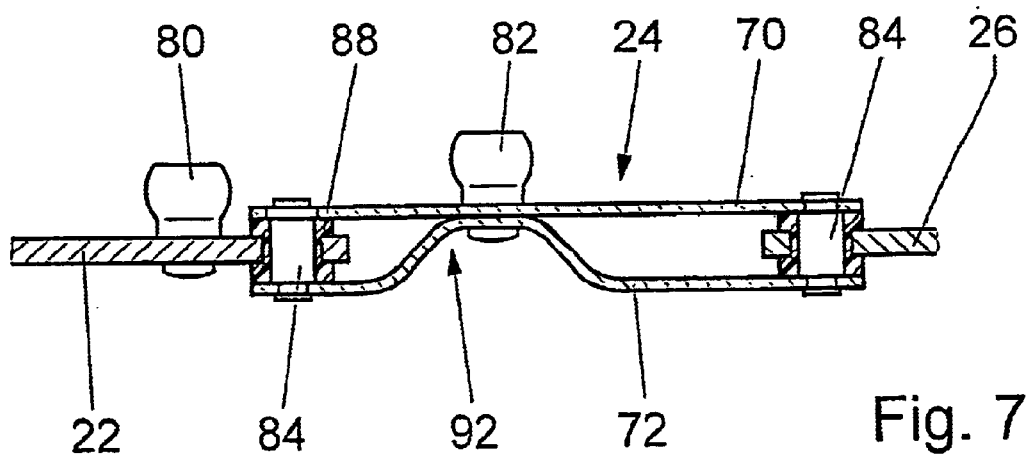
FIG. 7, a longitudinal section through a coupling rod of the coupling mechanism.

In the embodiment of FIG. 7, one ball peg 80 is secured to the crank 22, while a further ball peg 82 is disposed on the coupling rod 24 between the joint pins 84. The sheet-metal parts 70 and 72 are tacked together by the ball peg 82, and the sheet-metal part 72 is curved toward the sheet-metal part 70 and forms an offset bend 92, to assure freedom from collision with other drive parts.

Figure 8:
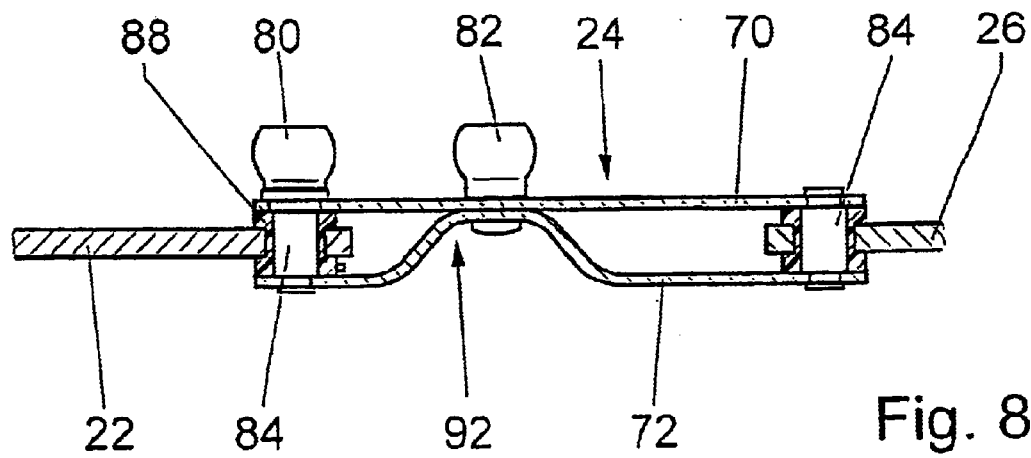
FIGS. 8–10, variants of FIG. 7.
Figure 9:
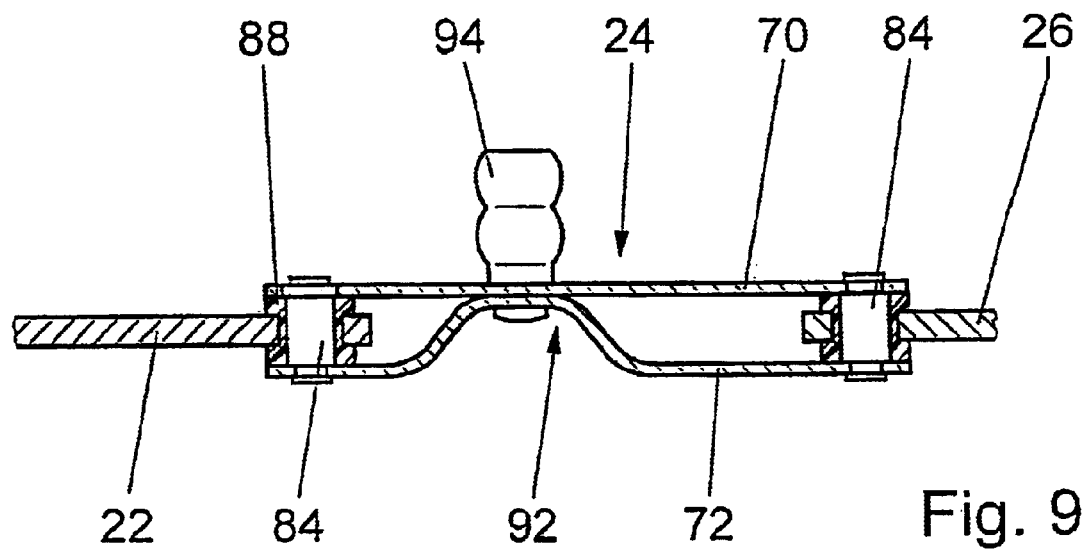
Figure 10:
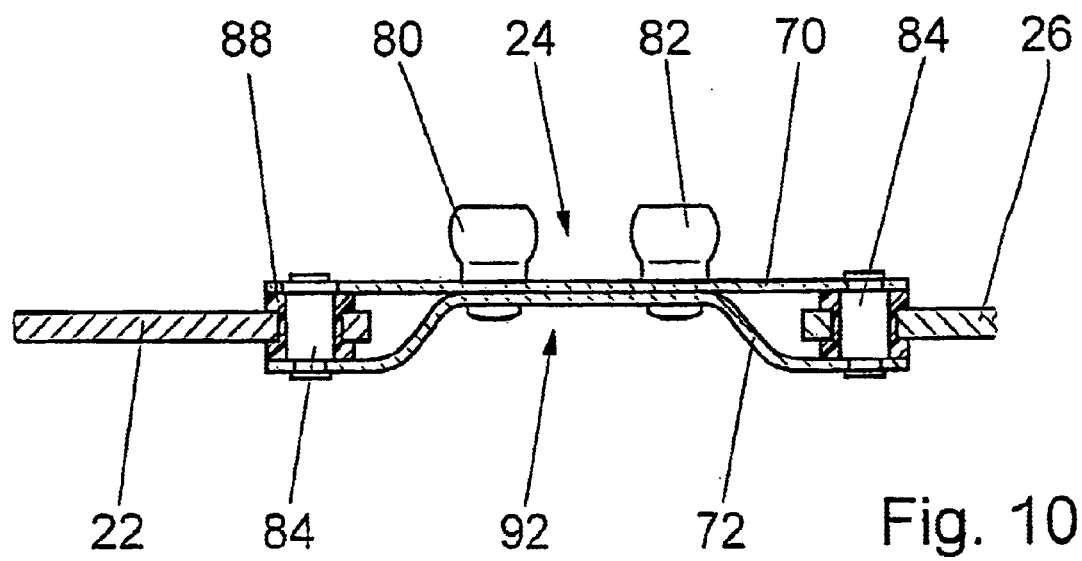

In a different embodiment from that of FIG. 7, the ball peg 80 in FIG. 8 is integrally embodied with the joint pin 84. FIG. 9 shows an embodiment In which a double-ball peg 94 suitably replaces the ball peg 82 of the versions in FIGS. 7 and 8. Finally, In the embodiment of FIG. 10, the ball pegs 80 and 82 are disposed side by side on the coupling part 24 between the joint pins 84. By means of them, the sheet-metal parts 70 and 72 are joined together in the same way as in the versions of FIGS. 7–9. As a result, there are numerous possible ways of varying the locations and designs of the articulation points of the joint rods 28, 30.

What is claimed is:

1. A drive apparatus for a wiper system (10), said drive apparatus comprising wiper motor (18);

lever drive mechanism for a wiper (12) of the wiper system, said lever drive mechanism comprising a drive lever (36) and a four-bar wiper lever (40) pivotally connected with the drive lever (36);

coupling mechanism (20) for coupling said lever drive mechanism with said wiper motor (18), said coupling mechanism (20) comprising a crank (22) connected with the wiper motor (18), a coupling rod (24) pivotally connected to said crank (22), a guide rod (26) pivotally supported at a bearing point (48) on the vehicle and connected in an articulated fashion with said coupling rod (24); and joint rod (28) pivotally connecting the drive lever (36) of the lever drive mechanism to the coupling mechanism (20), so that said lever drive mechanism is drivable by said drive motor (18) via said coupling mechanism.

2. The drive apparatus as defined in claim 1, wherein said coupling rod (24) is a sheet metal part (70, 72) provided with joint pins (84, 90) at respective opposite ends thereof, and said crank (22) and said guide rod (26) are pivotally connected at said respective opposite ends to said joint pins (84, 90) via corresponding bearing shells (88).

3. The drive apparatus as defined in claim 2, wherein at least one of said joint pins (84, 90) is unilaterally fastened to said coupling rod (24).

4. The drive apparatus as defined in claim 1, wherein said coupling rod (24) comprises two sheet metal parts (70, 72) provided with at least one joint pin (84) held at opposing ends of said metal parts.

5. The drive apparatus as defined in claim 1, wherein said coupling rod (24) has forked ends and at least one joint pin (84) retained in said forked ends.

6. The drive apparatus as defined in claim 5, wherein said coupling rod (24) comprises two sheet metal parts (70, 72) and has forked ends, and said two sheet metal parts (70,72) are attached together between said forked ends.

7. The drive apparatus as defined in claim 1, wherein said crank (22), said coupling rod (24) and/or said guide rod (26) are formed with offset bends (74, 76, 78) in a direction of motion and/or transversely to said direction of motion.

8. The drive apparatus as defined in claim 1, wherein said wiper motor (18) is reversible.

9. The drive apparatus as defined in claim 1, further comprising a mounting plate (42) provided on the vehicle and wherein said bearing point (48) is on said mounting plate (42).

10. The drive apparatus as defined in claim 1, wherein said joint rod (28) is pivotally connected to said coupling rod (24) by a ball peg (80) and said guide rod (26) is pivotally connected to said coupling rod (24) by another bail peg (82).

11. The drive apparatus as defined in claim 1, wherein said drive lever (36) is a cross guide rod.

12. A drive apparatus of a wiper system (10), said drive apparatus comprising wiper motor (18);

first lever drive mechanism for a first wiper (12) of the wiper system (10), said first lever drive mechanism comprising a drive lever (36) and a four-bar wiper lever (40) pivotally connected with the drive lever (36);

second lever drive mechanism for a second wiper (14) of the wiper system (10), said second lever drive mechanism comprising a joint rod (30) pivotally connected with said second wiper (14);

coupling mechanism (20) for coupling said first lever drive mechanism and said second lever drive mechanism with said wiper motor (18), wherein said coupling mechanism (20) comprises a crank (22) connected with said wiper motor (18), a coupling rod (24) pivotally connected to said crank (22), a guide rod (26) pivotally supported at a bearing point (48) on the vehicle and connected in an articulated fashion with said coupling rod (24); and another joint rod (28) pivotally connecting the drive lever (36) of the first lever drive mechanism to the coupling mechanism (20), and wherein said joint rod (30) is pivotally connected with the coupling mechanism (20);

whereby said first lever drive mechanism and said second lever drive mechanism are drivable by said drive motor (18) via said coupling mechanism (20).

13. The drive apparatus as defined in claim 12, wherein said another joint rod (28) or said joint rod (30) or guide rod (26) is provided with respective joint pins (84) at corresponding opposite ends thereof, said joint pins (84) arranged on said coupling rod (24) pivotally connect said drive lever (36) and said coupling rod (24) to said coupling rod (24) and said joint pins (84) are provided with ball pegs (80, 82).

14. The drive apparatus as defined in claim 13, wherein said ball pegs (80, 82,94) and said joint pins (84, 90) are riveted to said guide rod (26) and/or said coupling rod (24).

15. The drive apparatus as defined in claim 14, wherein said coupling rod (24) comprises two metal sheets (70, 72) and one of said two metal sheets remote from said ball pegs (80, 82, 94) is Indented or curved toward another of said two metal sheets and is riveted to said another of said two metal sheets by another ball peg.

16. The drive apparatus as defined in claim 13, wherein said ball pegs are double ball pegs (94).

17. The drive apparatus as defined in claim 12, wherein two ball pegs (80, 82) are arranged parallel to one another on said coupling rod (24).

18. The drive apparatus as defined in claim 12, wherein said drive lever (36) is a cross guide rod.

19. The drive apparatus as defined in claim 12, wherein said crank (22), said coupling rod (24) and/or said guide rod (26) are formed with offset bonds (74, 76, 78) in a direction of motion and/or transversely to said direction of motion.

20. The drive apparatus as defined in claim 12, wherein said wiper motor (18) is reversible.

21. The drive apparatus as defined in claim 12, further comprising a mounting plate (42) provided on the vehicle and wherein said bearing point (48) is on said mounting plate (42).

* * * * *